United States Patent
Xuan et al.

(10) Patent No.: US 7,383,025 B2
(45) Date of Patent: Jun. 3, 2008

(54) METHOD FOR PROCESSING RF SIGNALS FOR RECEIVING AND TRANSMISSION

(76) Inventors: Yongnan Xuan, 904, Building 20 West District 2, South China University of Technology, Guangzhou City, Guangdong Province (CN) 510641; Suili Feng, 904, Building 20 West District 2, South China University of Technology, Guangzhou City, Guangdong Province (CN) 510641

(*) Notice: Subject to any disclaimer, the term of this patent is extended or adjusted under 35 U.S.C. 154(b) by 262 days.

(21) Appl. No.: 10/250,807

(22) PCT Filed: Dec. 14, 2001

(86) PCT No.: PCT/CN01/01625

§ 371 (c)(1),
(2), (4) Date: Mar. 19, 2004

(87) PCT Pub. No.: WO02/056483

PCT Pub. Date: Jul. 18, 2002

(65) Prior Publication Data
US 2004/0152424 A1  Aug. 5, 2004

(30) Foreign Application Priority Data
Jan. 12, 2001  (CN)  ............... 01 1 02802

(51) Int. Cl.
| H04B 1/40 | (2006.01) |
| H04B 1/02 | (2006.01) |
| H04B 1/16 | (2006.01) |
| H04B 1/06 | (2006.01) |
| H04B 7/00 | (2006.01) |
| H04B 1/00 | (2006.01) |
| H03C 1/52 | (2006.01) |
| H03C 3/00 | (2006.01) |
| H03K 7/06 | (2006.01) |
| H04L 27/12 | (2006.01) |

(52) U.S. Cl. .................. 455/86; 455/108; 455/208; 455/255; 375/132; 375/307

(58) Field of Classification Search .............. 455/42, 455/61, 76, 86, 108, 208, 230, 255, 293; 375/132, 307, 303, 133, 134, 135, 136, 137
See application file for complete search history.

(56) References Cited

U.S. PATENT DOCUMENTS

| 3,641,434 A | * | 2/1972 | Yates et al. ............... 455/76 |
| 4,520,474 A | * | 5/1985 | Vilmur .................... 370/278 |
| 4,777,449 A | * | 10/1988 | O'Connor ................ 329/323 |
| 5,390,346 A | * | 2/1995 | Marz ....................... 455/260 |
| 5,483,679 A | * | 1/1996 | Sasaki ...................... 455/86 |
| 5,603,097 A | * | 2/1997 | Kanou ...................... 455/76 |
| 5,689,819 A | * | 11/1997 | Nishimura et al. ........ 455/86 |
| 5,781,538 A | * | 7/1998 | Ganesan et al. .......... 370/310 |
| 5,937,335 A | * | 8/1999 | Park et al. ................. 455/86 |

(Continued)

*Primary Examiner*—Nay Maung
*Assistant Examiner*—Andrew Wendell
(74) *Attorney, Agent, or Firm*—Thorpe North & Western LLP

(57) ABSTRACT

Methodology for processing of RF signals for receiving and transmission, which varies the frequencies of local oscillators, in order to enable the receivers and transmitters to operate with higher performance in wider or multi-bands. bands. Their integrations into ICs are also made easier.

10 Claims, 1 Drawing Sheet

U.S. PATENT DOCUMENTS

| | | | |
|---|---|---|---|
| 6,028,885 A * | 2/2000 | Minarik et al. | 375/135 |
| 6,246,713 B1 * | 6/2001 | Mattisson | 375/132 |
| 6,334,051 B1 * | 12/2001 | Tsurumi et al. | 455/324 |
| 6,343,209 B1 * | 1/2002 | Maeda et al. | 455/160.1 |
| 6,438,358 B1 * | 8/2002 | Higuchi | 455/84 |
| 6,724,804 B1 * | 4/2004 | Kegasa et al. | 375/130 |
| 6,738,602 B1 * | 5/2004 | Heinen et al. | 455/76 |

* cited by examiner

METHOD FOR PROCESSING RF SIGNALS FOR RECEIVING AND TRANSMISSION

CROSS-REFERENCE TO RELATED APPLICATIONS

This utility patent application claims benefit of and priority to International Application, PCT/CN01/01625, filed on Dec. 14, 2001 and published as WO 02/56483 A1 on Jul. 18, 2002, which in turn claims priority to China patent application No. CN 01102802.5 filed on Jan. 12, 2001.

FIELD OF THE INVENTION

The present invention relates to a methodology for the processing of radio frequency (RF) signals during receiving and transmission, and particularly to such a method for suppressing interference signals in (a) image and other interference signals in receiving and (b) interference to the channel and the receiving sides of the circuit when transmitting, without using high quality filtering components at RF frequencies which are difficult to integrate into integrated circuits (ICs).

BACKGROUND OF THE INVENTION

In communication fields, RF frequencies are often used as carriers for signal receiving and transmission. Using current techniques in the receiver, modulated RF frequency signals are received and filtered to attenuate interference, especially image signals, before being down converted to intermediate frequency (IF) frequencies. In the transmitter, filtering is also needed before the signals are transmitted, in order to reduce their interferences to communication channels and the receiving side of the circuits. In either of the receiving and transmitting processes, due to the strict signal filtering requirements, filtering components, such as filters and duplexers, usually cannot be made using normal inductors and capacitors, especially those which can be integrated into semiconductor ICs. Instead, components using, for example, dielectric resonators, surface acoustic wave elements and the like are needed. While these components works well, they are bulky in size, expensive, sensitive to manufacturing and assembly tolerances and are difficult to integrate into ICs. This is one of the major obstacles to integrate a circuit system into a single chip. Zero IF techniques used in receivers solved effectively the image interference problem. However, its application has been limited to certain types of systems, due to issues such as DC offset, sensitivities, and the like, which lower the performance of the receivers and require demanding compensation and processes.

It is an object of this invention to provide a methodology for RF frequency signal processing for receiving and transmission that solve the above problems associated with the current techniques.

BRIEF SUMMARY OF THE INVENTION

According to an embodiment of the invention, in the receiver, a received signal is mixed in mixer 4 with a local oscillator (LO) signal generated by local oscillator source 5 with varied frequencies. The resultant desired signal from mixer 4 is selected by IF filter 6 with correspondingly varied center frequencies. It can then be mixed again in mixer 7 with a second LO signal generated by local oscillator source 8 with correspondingly varied center frequencies and then be selected by filter 9. In the transmitter, a signal to be transmitted is mixed in mixer 11 with a LO signal generated by local oscillator source 12 with varied frequencies. The resultant IF signal is selected by filter 13 with correspondingly varied center frequencies. It is then further mixed in mixer 14 with a LO signal generated by local oscillator source 15 with correspondingly varied frequencies and then filtered by Filter 16.

There are a number of benefits using the process of the invention. Benefits associated with embodiments of the receiver include:

(1) The receiving of the desired signal is effective because it is spread, filter selected, de-spread and filter selected, while image and other interference signals are effectively attenuated, since the other interference signals are spread, filter-rejected, spread and filter-rejected.

(2) Due to the variation of the frequencies of local oscillator source 5 and local oscillator source 8, the image interference is not overlapping with the desired received signal at the 1st and 2nd IF. So filtering of the image can be implemented at the IF stages, which can be done with good performance and lower cost, compared with doing it at front end RF frequencies. The filters at IF frequencies are also easier to be integrated into ICs.

(3) Due to (1) and (2) above, the receiver in this invention has relaxed requirements on the performance of the RF filtering components. This leads to (A) it is easier to implement them using inductors and capacitors, rather than bulkier and more expensive components, such as ceramic or SAW components and (B) the receiver can operate at wider bands.

(4) Due to (B) in (3) above, it is easier to use software to set or change the operating frequency bands by controlling the frequencies of the LOs.

(5) Due to (A) in (3) above, it is easier to integrate the whole receiver, including the front end filtering components, into semiconductor ICs.

(6) Referring to (3) above, since the requirements for the RF filtering is relaxed, its insertion loss can be lowered at the front end, which increases the sensitivity of the receiver.

Benefits associated with embodiments of the transmitter include:

(1) The spurious mixing products of mixer 11 are spread and can then be effectively rejected, due to the frequency variation of the LO source 11.

(2) Due to the frequency variation of the LO source 15, the leakage of the LO signal through mixer 14 is spread and has less interference to the channel and the receiving side.

(3) Modulated signals can be produced with carriers with fixed or hopping frequencies by selecting the ways of the frequency variation of the LO source 15.

(4) Due to the spreading of various spurious signals, the filtering requirement for filter component 16 is lowered. So it is easier to implement it using inductors and capacitors, making it easier to integrate the whole transmitter into ICs.

(5) Due to the spreading of various spurious signals, which leads to relaxed filtering requirements for the filtering component 16, the component 16 can be of wider bandwidth. Thus by choosing parameters of the varied frequencies of the LOs 12 and 15, which can be programmed, the transmitter can operate in different frequency bands.

(6) Due to the spreading of various spurious signals, which leads to relaxed filtering requirements for the filtering component 16, the insertion loss of 16 can be reduced, which effectively increases the gain and the power consumption efficiency of the transmitter.

DETAILED DESCRIPTION OF THE INVENTION

Figure 1:
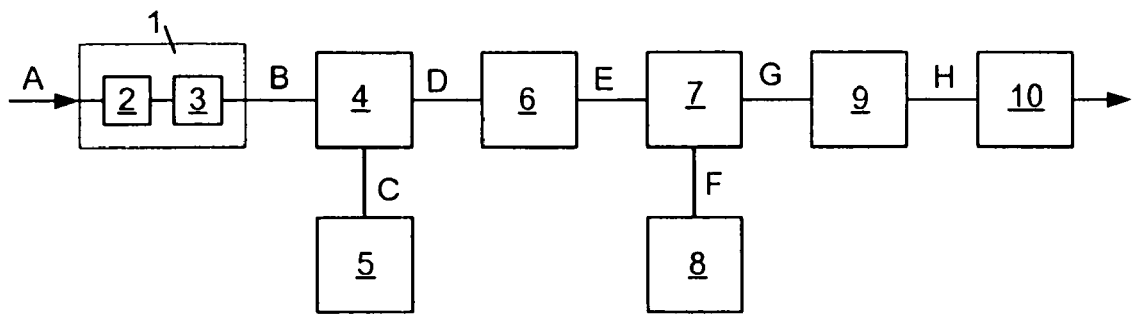
FIG. 1 is a functional block diagram of a receiver embodiment based on the present invention.

Referring to FIG. 1, the modulated received RF signal is input at Point A to the front end 1, which may have one or more filtering components 2, and/or a low noise amplifier 3. The functions of the front end 1 are to select and amplify the desired signal, while suppressing unwanted interferences, especially the image interference. After the processing by front end 1, the signal is fed at point B to the first mixer 4, mixed with the first LO signal at point C which is generated by LO source 5. The resultant first IF signal is output at point D. Unlike in receivers using conventional techniques, in this invention, the frequency of the LO signal from LO source 5, f5, is varied as a function of time. There are two interesting results of this aspect of the method of the present invention. First, an image interference corresponding to a certain value of the frequency of the first LO signal, f5, becomes a non-image interference when that frequency is varied to other values. As a result, except corresponding to that certain value of the frequency of the first LO signal, f5, the interference above is not overlapped with the desired signal at the first IF at point D. So, it can be filtered out at the IF stage. Second, at point D of the first IF stage, both the desired signal and the image signal are spread, whose frequencies vary as functions of the variation of the frequency of the first LO signal, f5.

According to an embodiment of the invention, the center frequency of the IF filter 6 is varied and follows the frequencies of the desired signal at point D so that the desired signal is effectively selected and fed to the input of second mixer 7. The image interference, on the other hand, is further attenuated by filter 6, after its spreading as described above. In mixer 7, the desired signal is mixed again with the second LO signal at point F generated by the second LO source 8. In this invention, the frequency of the second LO signal, f8, can be set to vary and synchronize with that of the desired signal at point E. So the desired signal is both mixed and de-spread by mixer 7 and has fixed frequencies at point G, and then selected by filter 9 and demodulated by demodulator 10. The frequency of the second LO signal, f8, can also be set to vary which is not synchronized with that of the desired signal at point E. In this case, the output at point G will be of varying frequencies. Note that in point E, since the frequencies of the image signal vary in general in different direction from that of the desired signal (and thus from that of the second LO signal at point F), the image signal is further spread in mixer 7 and then further attenuated by filter 9.

It is noted particularly that in this invention, the processing of the desired signal by mixer 4 and mixer 7 form a spread/de-spread process. As to the image interference, there are two scenarios. In the first scenario the frequency of the first LO signal, f5, is varied between the frequency of the desired received signal, fs, and the frequency of the image interference, fi, at point B, the image interference is spread in mixer 4 and is spread again in mixer 7 (spread-spread). In the second scenario, if f5 is varied outside of the frequency range between fs and fi at point B, then the image interference is spread by mixer 4 whose fi at point D will have the same distance with fs as at point B. It is thus easier to filter the image interference out at the IF filter 6 than if it were performed at the RF section between points A and B. This is because while having the same distance between fi and fs, the distance/fs ratio can be set to be much larger at IF point D than at RF point B. So in both scenarios, image interference can be effectively attenuated by the receiver in this invention.

Note also that the above-mentioned receiving process is independent of whether the desired signal is a spread spectrum signal or not. This invention can be implemented in both cases.

When the desired received signal at point A is a frequency-hopping signal, the variation of its frequencies at IF point E is the result of the variations of the frequencies of the desired signal and the first LO signal. Since the frequency of the second LO signal, f8, of LO source 8 can be set to synchronize with the varied frequencies of the desired signal at IF point E, the desired signal at the output of mixer 7, point G, can be of fixed frequency. This means that mixer 7 will implement both mixing and de-spreading of the desired frequency-hopping signal.

Figure 3:
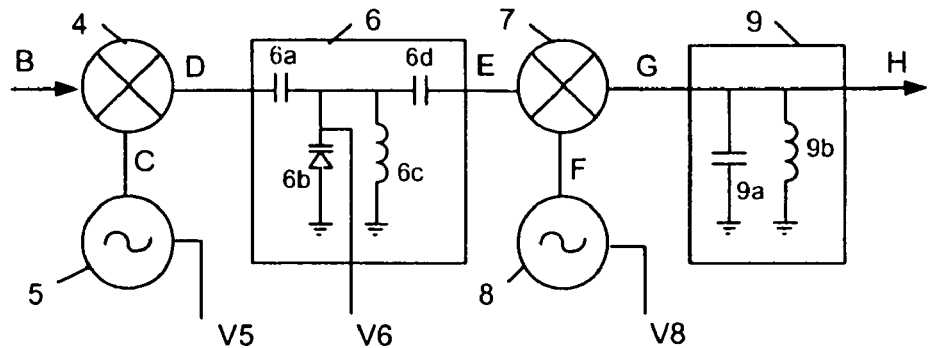
FIG. 3 is a circuit implementation of the receiver in FIG. 1.

Referring to FIG. 3, a circuit implementation of the core functional blocks from point B to point H of the receiver in FIG. 1 in the invention is shown. It can be seen from FIG. 3 that the interconnections of the functional blocks, namely, first mixer 4, first LO source 5, first IF filter 6, second mixer 7, second LO source 8 and second IF filter 9, are the same as those in FIG. 1. A circuit implementation for each of the above blocks is described as follows: Frequency conversions are performed with mixers 4 and 7. Voltage-controlled oscillators are used as the first and second LO sources 5 and 8, whose output frequencies vary as functions of voltages V5 and V8, respectively. The first IF filter 6 is a band pass filter. Its input is at point D connected to capacitor 6a. The other terminal of capacitor 6a is connected to the cathode of varactor 6b, inductor 6c and capacitor 6d. The anode of varactor 6b and the other terminal of inductor 6c are grounded. The other terminal of capacitor 6d, point E, gives the output of filter 6. A controlling voltage, V6, is applied to the cathode of varactor 6b. When V6 varies, the center frequency of filter 6 will vary. The second IF filter 9 is formed with capacitor 9a and inductor 9b in parallel. One terminal of the parallel circuit is grounded. The other terminal acts as the input and output points of the filter, i.e., points G and H.

Figure 2:
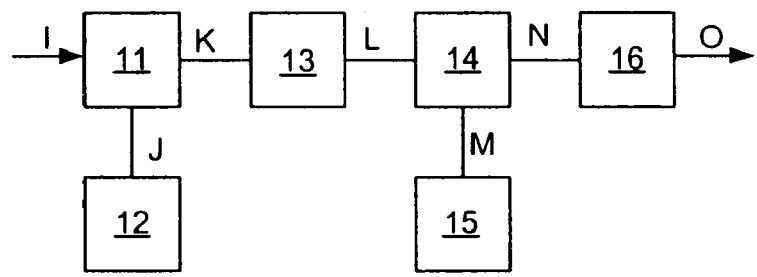
FIG. 2 is a functional block diagram of a transmitter embodiment based on the present invention.

Referring to FIG. 2, the signals to be transmitted are input at point I and mixed at mixer 11 with the LO signal at point J generated by LO source 12. The IF output at point K is selected by filter 13, which also attenuates spurious interferences and is further mixed in mixer 14 with the LO signal at point M generated by LO source 15. Filter 16 selects the signal from point N and delivers it to point O for transmission, while rejecting spurious interferences.

In this invention, the frequency of the LO signal at point J is varied as a function of time. The center frequency of filter 13 is also varied in such a way that it follows the variation of the IF signal to be transmitted at point K. So the desired signal is effectively selected, while the spurious interferences are spread due to the variation of the frequency of the LO signal at point J and are rejected effectively by filter 13. The frequency of the LO signal of 15 is also varied. If it synchronizes with the variation of the frequency of the transmitted signal at point K, the frequency of the output at points N and O is fixed. Otherwise, the transmitter can transmit the signal with frequencies that are hopping. In either case, the leakage of the LO signal of 15 to points N and O are spread. So its interference to communication channels and the receiving side of the circuit system is reduced.

Figure 4:
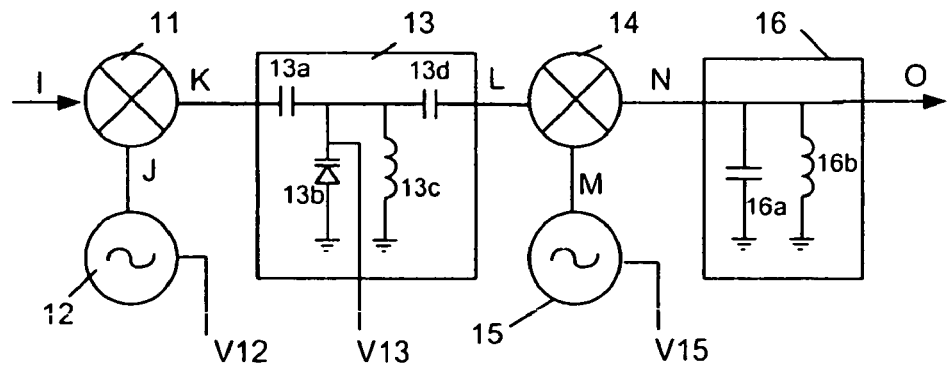
FIG. 4 is a circuit implementation of the transmitter in FIG. 2.

Referring to FIG. 4, a circuit implementation of the functional blocks of the transmitter in FIG. 2 in the present invention is shown. It can be seen from FIG. 4 that the interconnections of the functional blocks, namely, first mixer 11, first LO source 12, IF filter 13, second mixer 14, second LO source 15 and RF filter 16, are the same as those in FIG. 2. A circuit implementation for each of the above blocks is described as follows: Frequency conversions are performed with mixers 11 and 14. Voltage-controlled oscillators are used as the first and second LO sources 12 and 15, whose output frequencies vary as functions of voltages V12 and V15, respectively. IF filter 13 is a band pass filter. The input to IF filter 13 is at point K connected to capacitor 13a. The other terminal of capacitor 13a is connected to the cathode of varactor 13b, inductor 13c and capacitor 13d. The anode of varactor 13b and the other terminal of inductor 13c are grounded. The other terminal of capacitor 13d, point L, gives the output of filter 13. A controlling voltage, V13, is applied to the cathode of varactor 13b. When V13 varies, the center frequency of filter 13 will vary. The RF filter 16 is formed with capacitor 16a and inductor 16b in parallel. One terminal of the parallel circuit is grounded. The other terminal of the parallel circuit acts as the input and output points of the filter, i.e., points N and O.

In order to improve even further the performance of receivers based on the method of this invention, the LO signals may also be generated with multiple frequency components and the distances between the frequencies of the component may also be varied. In this case, filters and mixers need to be designed accordingly to process the multiple components. This can relax further the requirements for the performance of the filtering components at the RF front end, which can make the components more easily integrate into ICs.

The functional blocks used in the receiver and transmitter in the invention, such as mixers, filters, LO sources with varied frequencies, etc., can be implemented using analog circuits. Depending on the operation frequencies, such functional blocks can also be implemented with digital circuits. Due to the advancement of digital and device technologies, more and more functional blocks can be realized with digital circuits.

Accordingly, while this invention has been described with reference to illustrative embodiments, the illustrative embodiments of the invention are not intended to be construed in a limiting sense. Various modifications of the illustrative embodiments will be apparent to persons skilled in the art upon reference to this description. It is therefore contemplated that the appended claims will cover any such modification or embodiments as fall within the true scope of the invention.

We claim:

1. A method for processing radio frequency (RF) signals for receiving and transmitting, comprising:

(a) in a receiver, generating a first receive local oscillator (LO) signal by a first receive local oscillator source (5), wherein the frequency of the first receive LO signal is frequency hopped;

mixing the first receive LO signal in a Mixer (4) with a received RF signal to produce an intermediate frequency (IF) receive signal;

filtering the IF receive signal, with hopped frequencies, by a receive IF Filter (6) to produce a filtered receive signal;

generating a second receive LO signal by a second receive local oscillator source (8), wherein the frequency of the second receive LO signal is frequency hopped corresponding to the variation of the frequencies of the filtered receive signal so that the first receive LO signal and the second receive LO signal form a spread and despread pair located in the receiver;

mixing the second receive LO signal in a Mixer (7) with the filtered receive signal to produce a dehopped receive signal; and filtering the dehopped receive signal, with a Filter (9) for further processing;

(b) in a transmitter, generating a first transmit LO signal by a first transmit local oscillator source (12), wherein the frequency of the first transmit LO signal is frequency hopped;

mixing the first transmit LO signal in a Mixer (11) with a signal to be transmitted to produce an IF transmit signal;

filtering the IF transmit signal, with hopped frequencies, by a transmit IF Filter (13) to produce a filtered transmit signal;

generating a second transmit LO signal by a second transmit local oscillator source (15), wherein the frequency of the second transmit LO signal is frequency hopped corresponding to the variation of the frequencies of the filtered transmit signal so that the first transmit LO signal and the second transmit LO signal form a spread and despread pair located in the transmitter;

mixing the second transmit LO signal in a Mixer (14) with the filtered transmit signal to produce a dehopped transmit signal; and filtering the dehopped transmit signal with a Filter (16) for further processing.

2. The method according to claim 1, wherein the center frequencies of the receive IF Filter (6) are set to vary with the frequency hopping of the IF receive signal, and the center frequencies of the transmit IF Filter (13) are set to vary with the frequency hopping of the IF transmit signal.

3. The method according to claim 1, wherein the variation of the second transmit LO signal generated by the second transmit local oscillator source (15) is set in such ways that the frequency of the dehopped transmit signal is fixed.

4. The method according to claim 1, wherein the variation of the second transmit LO signal generated by the second transmit local oscillator source (15) is set in such ways that the frequency of the dehopped transmit signal is varying.

5. The method according to claim 1, wherein the processing of the RF signals for receiving and transmitting is implemented using analog circuits.

6. The method according to claim 1, wherein the processing of the RF signals for receiving and transmitting is implemented using, partially or fully, digital circuits.

7. The method according to claim 1, wherein the signal outputs of the local oscillator sources (5) and (8) are set to have multiple frequency components.

8. The method according to claim 7, wherein the distances between frequencies of the multiple frequency components are varying.

9. A method for processing a received radio frequency (RF) signal, in a receiver comprising:
- receiving a RF signal for processing;
- generating a frequency hopped first local oscillator (LO) signal;
- mixing the RF signal with the frequency hopped first LO signal to obtain an intermediate frequency (IF) signal with frequency hopping;
- filtering the IF signal to obtain a filtered IF signal;
- generating a second LO signal having a frequency hopping with the frequencies of the filtered IF signal so that the first LO signal and the second LO signal form a spread and despread pair located in the receiver;
- mixing the filtered IF signal with the second LO signal to obtain a mixed signal; and
- filtering the mixed signal to obtain an output signal.

10. A method for processing a signal to be transmitted in a transmitter, comprising:
- receiving a signal to be transmitted;
- generating a first frequency hopped local oscillator (LO) signal;
- mixing the first frequency hopped LO signal with the signal to be transmitted to obtain an intermediate frequency (IF) signal with frequency hopping;
- filtering the IF signal to obtain a filtered IF signal;
- generating a second frequency hopped LO signal having a frequency hopping with the frequencies of the filtered IF signal so that the first LO signal and the second LO signal form a spread and despread pair located in the receiver
- mixing the filtered IF signal with the second frequency hopped LO signal to obtain a mixed filtered IF signal; and
- filtering the mixed filtered IF signal to obtain an output signal.

* * * * *